(12) United States Patent
Dang et al.

(10) Patent No.: US 9,417,810 B1
(45) Date of Patent: Aug. 16, 2016

(54) POWER MANAGEMENT FOR A DATA STORAGE SYSTEM

(71) Applicant: Western Digital Technologies, Inc., Irvine, CA (US)

(72) Inventors: Dean V. Dang, Fountain Valley, CA (US); Colin W. Morgan, Mission Viejo, CA (US); Kent W. Gibbons, Yorba Linda, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 273 days.

(21) Appl. No.: 14/038,733

(22) Filed: Sep. 26, 2013

Related U.S. Application Data

(60) Provisional application No. 61/859,471, filed on Jul. 29, 2013.

(51) Int. Cl.
| | | |
|---|---|---|
| *G06F 1/00* | (2006.01) |
| *G06F 3/06* | (2006.01) |
| *G06F 12/08* | (2016.01) |
| *G06F 1/32* | (2006.01) |
| *G06F 12/06* | (2006.01) |

(52) U.S. Cl.
CPC ............ *G06F 3/0625* (2013.01); *G06F 1/3225* (2013.01); *G06F 1/3275* (2013.01); *G06F 3/0659* (2013.01); *G06F 3/0683* (2013.01); *G06F 12/06* (2013.01); *G06F 12/0866* (2013.01)

(58) Field of Classification Search
CPC ..... G06F 1/3225; G06F 1/3275; G06F 12/06; G06F 12/0866
See application file for complete search history.

(56) References Cited

U.S. PATENT DOCUMENTS

| | | | |
|---|---|---|---|
| 7,411,757 B2 | 8/2008 | Chu et al. | |
| 7,568,068 B2 | 7/2009 | Kulkarni et al. | |
| 8,131,892 B2 | 3/2012 | Kumasawa et al. | |
| 8,296,513 B1 | 10/2012 | Liu | |
| 2004/0153639 A1* | 8/2004 | Cherian | G06F 15/177 713/2 |
| 2005/0216626 A1* | 9/2005 | Tran | G06F 1/189 710/100 |
| 2007/0011472 A1* | 1/2007 | Cheng | G06F 1/266 713/300 |
| 2008/0148083 A1* | 6/2008 | Pesavento | G06F 1/3203 713/322 |
| 2008/0162807 A1* | 7/2008 | Rothman | G06F 11/1076 711/114 |
| 2010/0223418 A1* | 9/2010 | Kumasawa | G06F 1/3221 710/316 |
| 2011/0119464 A1* | 5/2011 | Karr | G06F 3/0613 711/171 |
| 2012/0161942 A1* | 6/2012 | Muellner | G07C 9/00309 340/10.5 |
| 2012/0191996 A1 | 7/2012 | Cheong | |
| 2014/0047261 A1* | 2/2014 | Patiejunas | G06F 1/266 713/330 |

* cited by examiner

*Primary Examiner* — Thomas Lee
*Assistant Examiner* — Zhipeng Wang

(57) ABSTRACT

A data storage system including a plurality of storage devices, each of the storage devices in the plurality of storage devices comprising a plurality of logical block addresses ("LBAs") and configured to be in a first operating mode or a second operating mode, wherein the second operating mode comprises a reduced power mode relative to the first operating mode, and a bridge configured to be connected to the plurality of storage devices and a host configured to transmit a host command to access an LBA. The bridge is configured to receive the host command to access the LBA, determine a storage device in the plurality of storage devices where the LBA is located, and indicate only to the storage device where the LBA is located, that the storage device where the LBA is located should transition from the second operating mode to the first operating mode.

18 Claims, 7 Drawing Sheets

| Command From Host | First Storage Device | Second Storage Device |
|---|---|---|
| Slumber | Slumber | Slumber |
| Wake Up | Slumber | Slumber |
| Command for First Storage Device | Wake Up | Slumber |
| Command for Second Storage Device | Slumber | Wake Up |

| Command From Host | First Storage Device | Second Storage Device |
|---|---|---|
| Slumber | Slumber | Slumber |
| Wake Up | Slumber | Slumber |
| Command for First Storage Device | Wake Up | Slumber |
| Command for Second Storage Device | Slumber | Wake Up |

FIG. 4

| Indication to Host | First Storage Device | Second Storage Device |
|---|---|---|
| Slumber | Slumber | Slumber |
| Active | Active | Slumber |
| Active | Slumber | Active |
| Active | Active | Active |

FIG. 7

| Indication to Host | First Storage Device | Second Storage Device |
|---|---|---|
| Active | Slumber | Slumber |
| Active | Active | Slumber |
| Active | Slumber | Active |
| Active | Active | Active |

FIG. 8

POWER MANAGEMENT FOR A DATA STORAGE SYSTEM

CROSS-REFERENCE TO RELATED APPLICATIONS

This application claims the benefit of U.S. Provisional Application No. 61/859,472, filed on Jul. 29, 2013, entitled "POWER MANAGEMENT FOR HYBRID DRIVE," which is hereby incorporated by reference in its entirety.

BACKGROUND

In a conventional computer system, the computer system may include a host and a plurality of storage devices. To read data from the storage devices or write data to the storage devices, the host may issue commands to access the storage devices. However, there may be times when the host does not issue commands to access the storage devices. In such cases, the storage devices may still consume power. In the case where the conventional computer system has a limited power source or battery life, this may reduce the operational time of the conventional computer system without depleting the power source or the battery life.

BRIEF DESCRIPTION OF THE DRAWINGS

The features and advantages of the present embodiments will become more apparent from the detailed description set forth below when taken in conjunction with the drawings, wherein:

FIG. 4 depicts a table for transitioning one or more storage devices from a first operating mode to a second operating mode according to an embodiment;

FIG. 7 depicts a table for operating a plurality of storage devices in a data storage system according to an embodiment; and FIG. 8 depicts a table for operating a plurality of storage devices in a data storage system according to an embodiment.

DETAILED DESCRIPTION

Figure 1:
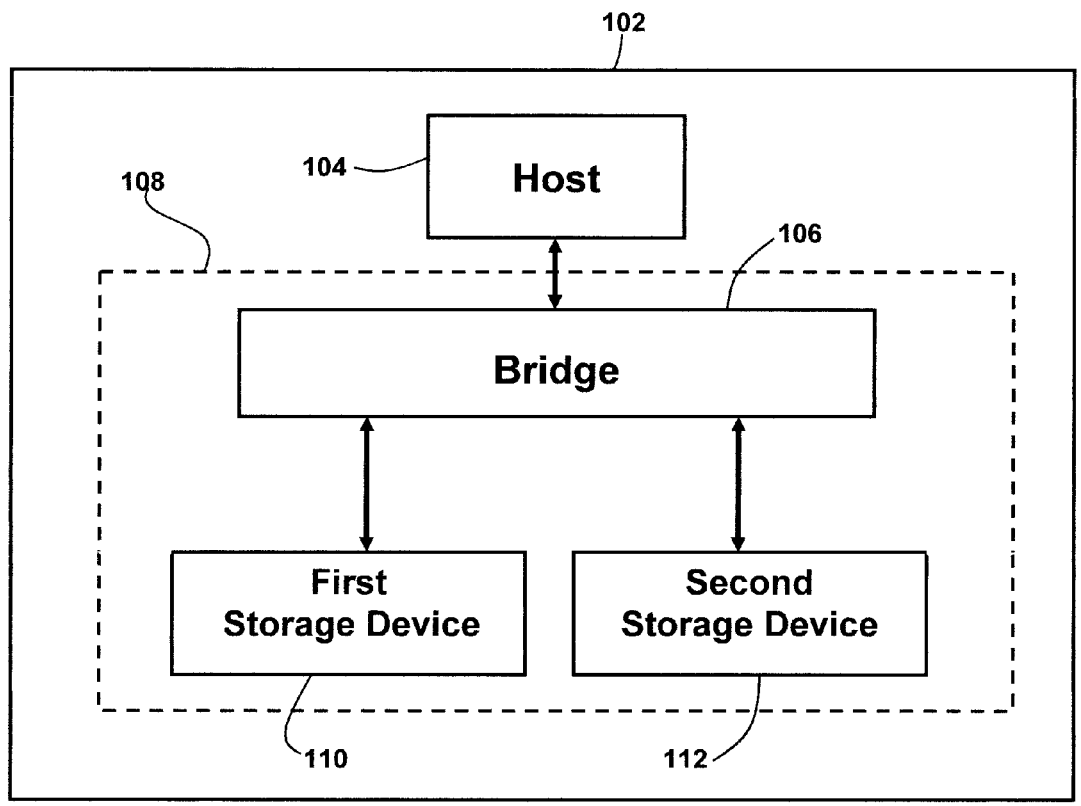
FIG. 1 is a block diagram of a computer system according to an embodiment.

In an embodiment, a computer system 102 comprises a host 104 and a data storage system 108 as shown in FIG. 1. In an embodiment, the host 104 is configured to transmit one or more host commands to the data storage system 108. In an embodiment, the host commands can comprise accessing a logical block address ("LBA") on the data storage system 108. Accessing the LBA can comprise, for example, writing data to the LBA or reading data from the LBA.

In an embodiment, the data storage system 108 comprises a bridge 106, and a plurality of storage devices such as the first storage device 110 and the second storage device 112. In an embodiment, the bridge comprises a serial advanced technology attachment ("SATA") to Dual SATA Bridge ("SDSB").

In an embodiment, other types of bridges may be utilized in the computer system 102. In an embodiment, the host 104 is connected to the bridge 106 at a host port and the storage devices are connected to the bridge 106 at internal ports.

Although two storage devices are shown in the embodiment disclosed in FIG. 1, additional storage devices may also be utilized. In an embodiment, the storage devices can comprise a plurality of LBAs. Furthermore, the storage devices may be a hard disk drive, a hybrid disk drive, or a solid state drive.

Figure 2:
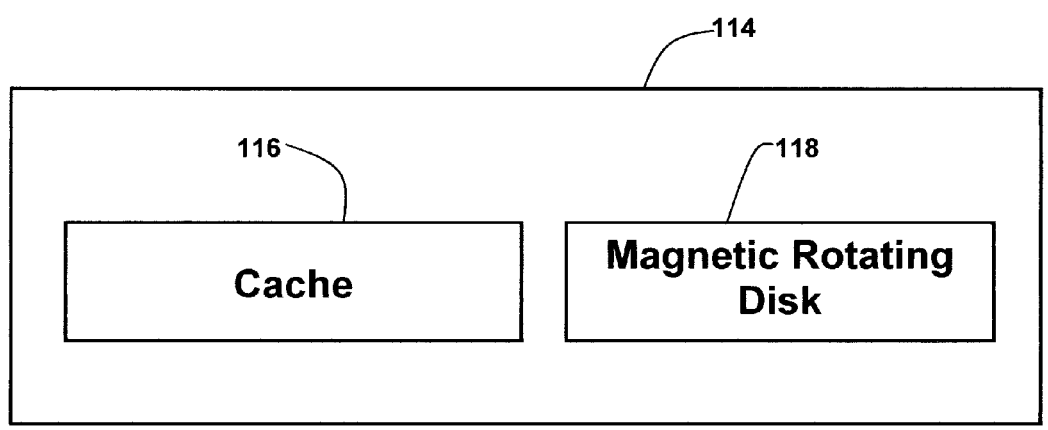
FIG. 2 is a block diagram of a hard disk drive according to an embodiment.

In an embodiment, the solid state drive comprises a solid state memory. In an embodiment, a hard disk drive 114 is shown in FIG. 2. In the embodiment shown in FIG. 2, the hard disk drive 114 comprises a cache memory 116 and a magnetic rotating disk 118. The cache memory 116 can comprise, for example, volatile memory such as dynamic random access memory ("DRAM"). The cache memory 116 can be utilized to store data temporarily which will be flushed to the hard disk drive 114 when a cache flush condition has been reached. In an embodiment, the cache memory 116 stores data which have been recently used, will be used, or has recently changed.

In an embodiment, a hybrid drive may comprise aspects of both the solid state drive and the hard disk drive. For example, the hybrid drive may comprise both the solid state memory and the magnetic rotating disk 118. Optionally, the hybrid drive may also comprise the cache memory 116.

While the description herein refers to solid state memory generally, it is understood that solid state memory may comprise one or more of various types of solid state non-volatile memory devices such as flash integrated circuits, Chalcogenide RAM (C-RAM), Phase Change Memory (PC-RAM or PRAM), Programmable Metallization Cell RAM (PMC-RAM or PMCm), Ovonic Unified Memory (OUM), Resistance RAM (RRAM), NAND memory (e.g., single-level cell (SLC) memory, multi-level cell (MLC) memory, or any combination thereof), NOR memory, EEPROM, Ferroelectric Memory (FeRAM), Magnetoresistive RAM (MRAM), other discrete NVM (non-volatile memory) chips, or any combination thereof.

Referring back to the embodiment shown in FIG. 1, the storage devices need not be the same type of drive. For example, the first storage device 110 could be a hard disk drive, while the second storage device 112 could be a solid state drive. However, in some embodiments, the storage devices may be the same type of drive. For example, the first storage device 110 and the second storage device 112 could both be hard disk drives.

In an embodiment, the individual storage devices in the data storage system 108 are hidden from the host 104. Instead, in an embodiment, the bridge 106 can translate LBAs from the host 104 to physical addresses in the storage devices to ensure that host data is appropriately written in the storage devices. That is, the host 104 can indicate to the bridge 106 that host data should be written to a particular LBA and the bridge 106 can determine the physical address of the LBA.

The bridge 106 can then write the host data to the physical address corresponding to the LBA. For example, when the host 104 wants to write host data to a LBA, the bridge 106 will determine the physical address of the LBA as it relates to the storage devices. Thus, if the LBA is located on the first storage device 110, then the bridge 106 will ensure that host data is written to the first storage device 110. Similarly, if the LBA is located on the second storage device 112, then the bridge 106 will ensure that host data is written to the second storage device 112. In an embodiment, the bridge 106 can translate the LBAs to physical addresses using a lookup table.

In an embodiment, power savings for the data storage system 108 comprises Host Initiated Power Management ("HIPM") or Drive Initialed Power Management ("DIPM"). In HIPM, the host 104 provides power management of the data storage system 108. For example, the host 104 can indicate when the storage devices in the data storage system 108 should be in a first operating mode or a second operating mode, wherein the second operating mode is a reduced power mode relative to the first operating mode.

In an embodiment, during HIPM, the host 104 indicates a single operating mode to the data storage system 108 and assumes that all of the storage devices will have the same operating mode. For example, when the data storage system 108 is in the first operating mode the host 104 assumes that the first storage device 110 and the second storage device 112 are in the first operating mode. For example, the bridge 106 can respond with an acknowledgment to the host 104 that the first storage device 110 and the second storage device 112 are in the first operating mode. Similarly, when the data storage system 108 is in the second operating mode, the host 104 assumes that the first storage device 110 and the second storage device 112 are in the second operating mode. For example, the bridge 106 can respond with an acknowledgment to the host 104 that the first storage device 110 and the second storage device 112 are in the second operating mode.

In an embodiment, in DIPM, each of the storage devices in the data storage system 108 provides its own power management. In an embodiment, in DIPM, the bridge 106 can provide the power management for each of the storage devices in the data storage system 108. In an embodiment, the storage devices or the bridge 106 can still report the operating mode that the storage devices are in to the host 104.

In an embodiment, the first operating mode comprises an active mode and the second operating mode comprises a slumber mode. In an embodiment, the active mode comprises a PHY ready mode where the SATA physical interface for a storage device is ready to send/receive data. In an embodiment, the SATA physical interface can comprise interfaces located in the bridge 106 for the storage device, such as the internal ports, and interfaces located in the storage device.

In an embodiment, in a slumber mode, the SATA physical interface is in a reduced power mode. In an embodiment, in the slumber mode, the SATA physical interface can transition to the active or PHY Ready mode in 10 ms or less. In an embodiment, the slumber mode utilizes approximately 50 mA less current than the active mode for each storage device in the data storage devices 108. In an embodiment, the PHY Ready mode and the slumber mode correspond to SATA Standards such as those included in the Serial ATA specification developed by SATA-IO, the Serial ATA International Organization.

Figure 3:
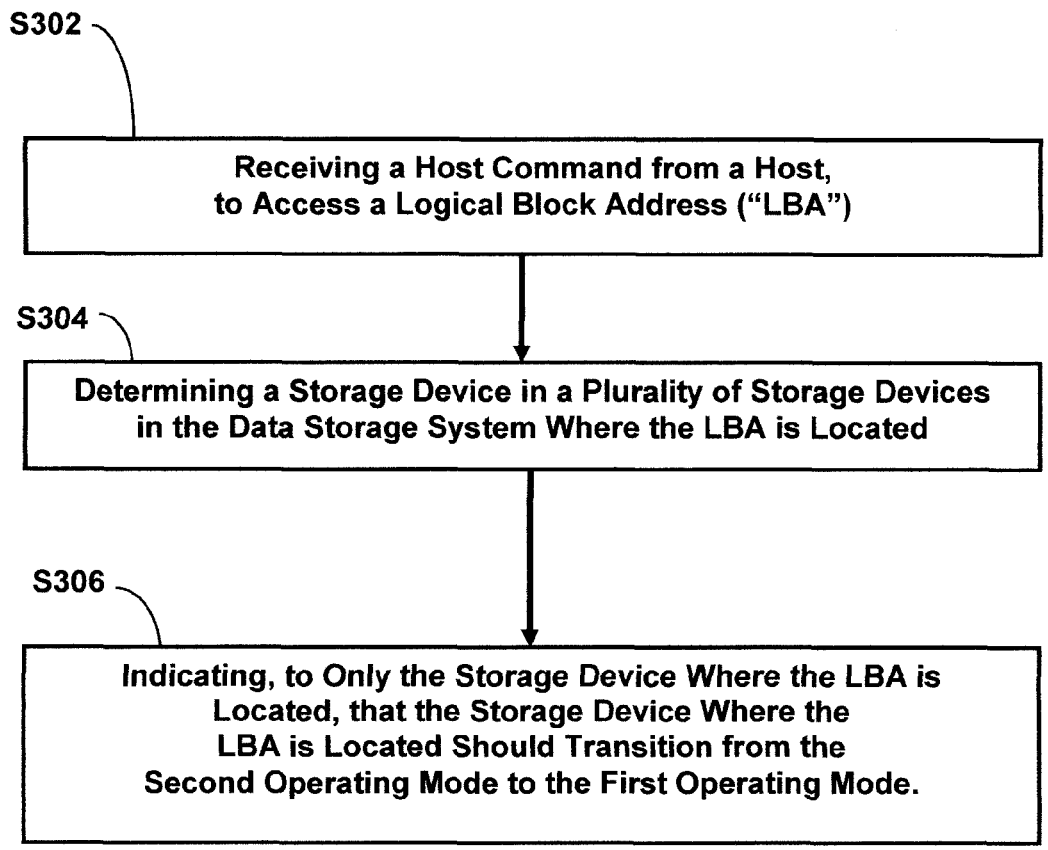
FIG. 3 depicts a process for access a logical block address according to an embodiment.

In an embodiment, even in HIPM, the bridge 106 can also provide power management by selectively indicating when each of the storage devices in the data storage system 108 should wake up, or transition from the second operating mode (slumber) to a first operating mode (active) according to a process shown in FIG. 3.

In block 5302, the bridge 106 receives a host command from the host 104 to access a LBA. In block 5304, the bridge 106 determines when a storage device in the plurality of storage devices in the data storage system 108 where the LBA is located.

In block 5306, the bridge 106 indicates to only the storage device where the LBA is located, that the storage device where the LBA is located should transition from the second operating mode to the first operating mode as shown in an embodiment in FIG. 4.

In the embodiment shown in FIG. 4, when the host 104 provides a host command to the data storage system 108 to enter the second operating mode (slumber), the bridge 106 can pass on the host command to enter the second operating mode to both the first storage device 110 and the second storage device 112. In such a case, the first storage device 110 and the second storage device 112 can enter the second operating mode.

However, when the host 104 provides a host command to the data storage system 108 to enter the first operating mode (active), the bridge 106 can prevent the command from reaching the first storage device 110 and the second storage device 112. Thus, the first storage device 110 and the second storage device 112 can remain in the second operating mode (slumber). In an embodiment, even though the host 104 is indicating that the storage devices should be in the first operating mode, the host may be able to provide other functions which do not utilize the storage devices. Thus, by having the storage devices remain in the second operating mode, power utilization by the storage devices can be reduced.

When the host 104 provides a command which requires access to the data storage system 108, the bridge 106 can determine which storage device needs to be accessed to fulfill the command, and then wake up only the storage device which needs to be accessed. For example, if the host 104 provides a command to access a LBA, the bridge 106 can determine a physical location of the corresponding LBA. If the LBA corresponds to a physical address which is located in the first storage device 110, the bridge 106 will wake up the first storage device 110 and not the second storage device 112. Thus, the bridge 106 will indicate to the first storage device 110 to transition from the second operating mode (slumber) to the first operating mode (active). The second storage device 112 will remain in the second operating mode (slumber).

However, if the LBA corresponds to a physical address which is located in the second storage device 112, the bridge 106 will wake up the second storage device 112 and not the first storage device 110. Thus, the bridge 106 will indicated to the second storage device 112 to transition from the second operating mode (slumber) to the first operating mode (active). The first storage device 110 will remain in the second operating mode (slumber).

Thus, instead of waking up both storage devices, only a storage device which corresponds to a physical location of the LBA is woken up by the bridge 106. This can conserve power since the other storage devices will not be unnecessarily woken up.

In an embodiment, when the storage device comprise the hard disk drive 114 (FIG. 2), and the hard disk drive 114 is in the second operating mode, the hard disk drive 114 can also implement additional power saving modes to further reduce power consumption. For example, the hard disk drive 114 can have a head not be actively tracking a movement of the magnetic rotating disk 118, the hard disk drive 114 can move the head away from the magnetic rotating disk 114, or the hard disk drive 114 can even spin down the magnetic rotating disk 118. In an embodiment, spinning down the magnetic rotating disk 118 can reduce, for example, current usage by approximately 1 mA.

In an embodiment, the cache memory 116 inside the hard disk drive 114 can also be considered another storage device. For example, the cache memory 116 may store data which will be flushed to the magnetic rotating disk 118. In such a case, the magnetic rotating disk 118 may not need to be spun up if the hard disk drive 114 has implemented an additional power saving mode, and can remain in the additional power savings mode. In an embodiment, the hard disk drive 114 can also remain in the second operating mode. In an embodiment, a cache memory inside the solid state drive can also be considered another storage device. For example, the cache inside the solid state drive may store data which will be flushed to the solid state memory. In an embodiment, this can reduce an amount of read-modify-write operations performed by the solid state memory. In an embodiment, this can reduce an amount of partial writes performed by the solid state memory.

Figure 5:
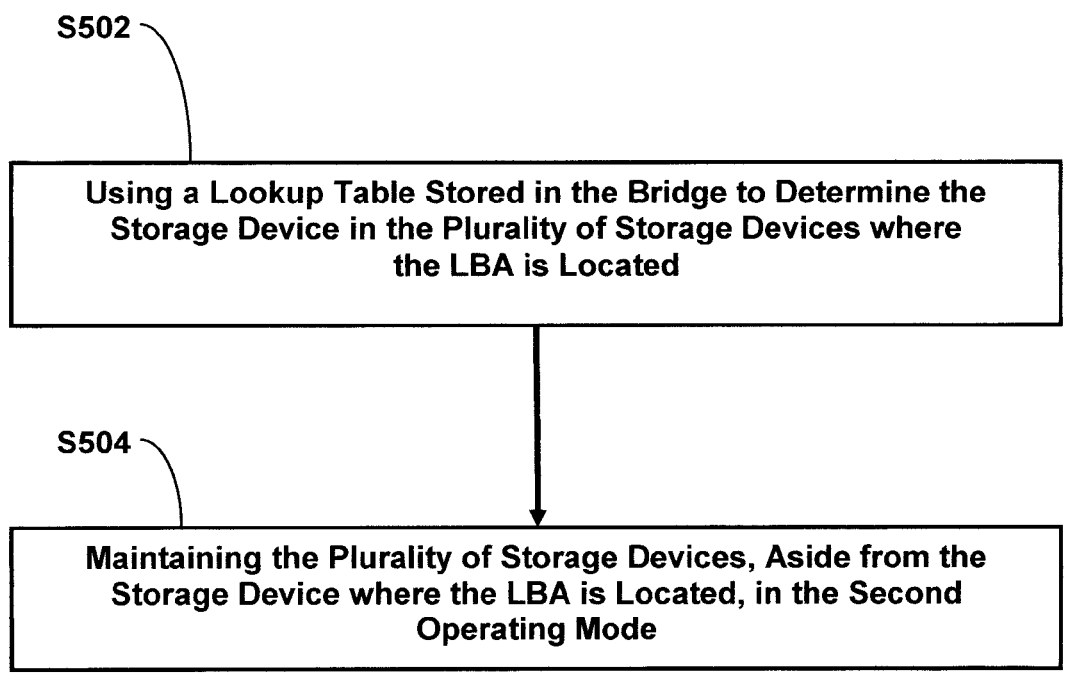
FIG. 5 depicts a process with additional optional blocks for accessing a logical block address is according to an embodiment.

In an embodiment, the bridge 106 can also implement additional blocks in a process shown in FIG. 5 in addition to the process shown in an embodiment in FIG. 3. In block S502, the bridge 106 uses a lookup table stored in the bridge 106 to determine the storage device in the plurality of storage devices where the LBA is located. For example, the bridge 106 can determine whether the LBA is located in the first storage device 110 or the second storage device 112 using the lookup table.

In block S504, the bridge 106 can maintain the plurality of storage devices, aside from the storage device where the LBA is located, in the second operating mode. For example, if the LBA is located in the first storage device 110, the bridge 106 can maintain the second storage device 112 in the second operating mode. Similarly, if the LBA is located in the second storage device 112, the bridge 106 can maintain the first storage device 110 in the first operating mode.

Figure 6:
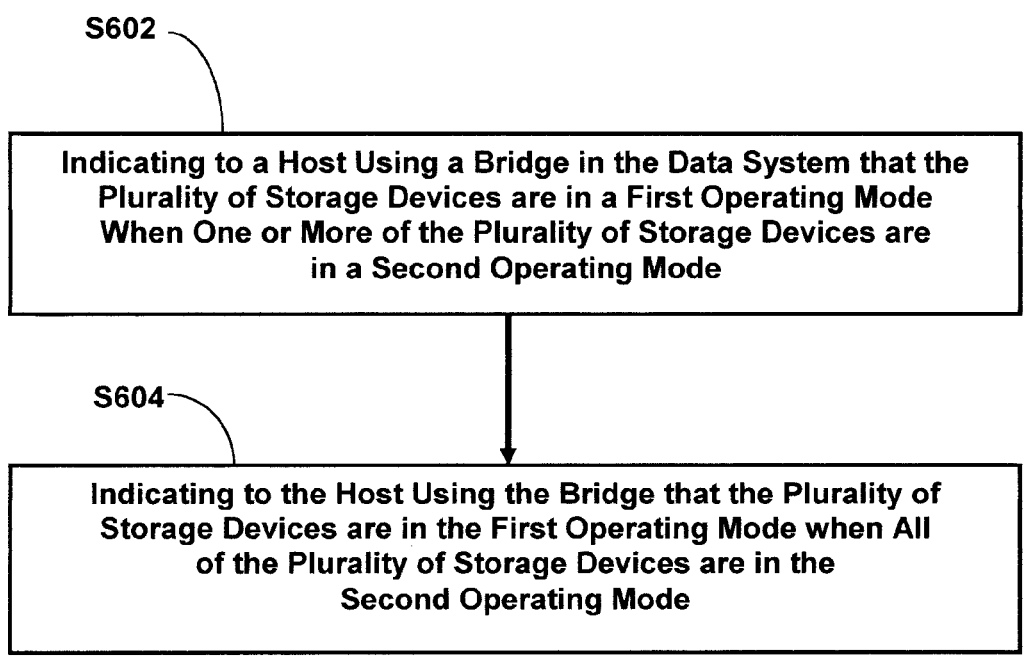
FIG. 6 depicts a process for operating a plurality of storage devices in a data storage system according to an embodiment.

In an embodiment, during DIPM, the bridge 106 can indicate to the host 104 that the storage devices in the data storage system 108 are in the first operating mode (active), even when one or more of the storage devices are in the second operating mode (slumber) according to a process shown in FIG. 6. In block S602, the bridge 106 indicates to the host 104 that the plurality of storage devices are in the first operating mode (active) when one or more of the plurality of storage devices are in the second operating mode as shown in an embodiment in FIG. 7.

In the embodiment shown in FIG. 7, the bridge 106 indicates to the host 104 that the first storage device 110 and the second storage device 112 are in the first operating mode (active) when the first storage device 110 is in the first operating mode (active) and the second storage device 112 is in the second operating mode (slumber). Similarly, the bridge 106 indicates to the host 104 that the first storage device 110 and the second storage device 112 are in the first operating mode (active) when the first storage device 110 is in the second operating mode (slumber) and the second storage device 112 is in the first operating mode (active).

In an embodiment, this reduces the amount of times that the host 104 has to communicate with the storage devices to transition the storage device from the second operating mode (slumber) to the first operating mode (active). In an embodiment, this reduces overhead for the host 104 since less handshaking communications will be required. In an embodiment, this can increase a processor efficiency of the host 104 and reduce power consumption.

In an embodiment, this can also decrease power consumption since it may take a larger amount of power for the host 104 to command one of the storage devices to transition from the second operating mode (slumber) to the first operating mode (active), even when the one of the storage devices is in the second operating mode (slumber).

When the first storage device 110 and the second storage device 112 are both in the first operating mode (active), the bridge 106 indicates to the host 104 that both the first storage device 110 and the second storage device 112 are in the first operating mode (active). However, when the first storage device 110 and the second storage device 112 are both in the second operating mode (slumber), the bridge 106 indicates to the host 104 that both the first storage device and the second storage device 112 are in the second operating mode (slumber).

Optionally, in block S604, the bridge 106 indicates to the host that the plurality of storage devices are in the first operating mode (active) when all of the plurality of storage devices are in the second operating mode (slumber) as shown in an embodiment in FIG. 8.

In the embodiment shown in FIG. 8, the bridge 106 operates similarly to the embodiment shown in FIG. 7. However, in the embodiment shown in FIG. 8, the bridge 106 indicates to the host 104 that both the first storage device 110 and the second storage device 112 are in the first operating mode (active), even when both the first storage device 110 and the second storage device 112 are in the second operating mode (slumber).

In an embodiment, this reduces the requirement for the host to continually monitor the storage devices to determine what type of mode they are in. Instead, the host 104 will just assume that the storage devices are in the first operating mode. In an embodiment, this can also reduce the amount of times that the host 104 has to communicate with the storage devices to transition the storage device from the second operating mode (slumber) to the first operating mode (active). In an embodiment, this reduces overhead for the host 104 since less handshaking communications will be required. In an embodiment, this can increase a processor efficiency of the host 104 and reduce power consumption.

In an embodiment, this can also decrease power consumption since it may take a larger amount of power for the host 104 to command the storage devices to transition from the second operating mode (slumber) to the first operating mode (active), even when both of the storage devices are in the second operating mode (slumber).

Those of ordinary skill would appreciate that the various illustrative logical blocks, modules, and algorithm parts described in connection with the examples disclosed herein may be implemented as electronic hardware, computer software, or combinations of both. Furthermore, the embodiments can also be embodied on a non-transitory machine readable medium causing a processor or computer to perform or execute certain functions.

To clearly illustrate this interchangeability of hardware and software, various illustrative components, blocks, modules, circuits, and process parts have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosed apparatus and methods.

The parts of a method or algorithm described in connection with the examples disclosed herein may be embodied directly in hardware, in a software module executed by a processor, or in a combination of the two. The parts of the method or algorithm may also be performed in an alternate order from those provided in the examples. A software module may reside in RAM memory, flash memory, ROM memory, EPROM memory, EEPROM memory, registers, hard disk, a removable disk, an optical disk, or any other form of storage medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC).

The previous description of the disclosed examples is provided to enable any person of ordinary skill in the art to make or use the disclosed methods and apparatus. Various modifications to these examples will be readily apparent to those skilled in the art, and the principles defined herein may be applied to other examples without departing from the spirit or scope of the disclosed method and apparatus. The described embodiments are to be considered in all respects only as illustrative and not restrictive and the scope of the disclosure is, therefore, indicated by the appended claims rather than by the foregoing description. All changes which come within the meaning and range of equivalency of the claims are to be embraced within their scope.

What is claimed is:

1. A data storage system comprising:
a plurality of storage devices, each of the storage devices in the plurality of storage devices comprising a plurality of logical block addresses ("LBAs") and configured to be in a first operating mode or a second operating mode, wherein the first operating mode comprises an active mode where the storage device is ready to send or receive data and the second operating mode comprises a reduced power mode relative to the first operating mode; and
a bridge configured to be connected to the plurality of storage devices and a host configured to transmit host commands to the bridge, wherein the bridge is further configured to:
receive a first host command for the data storage system to enter the first operating mode;
prevent the first host command from reaching the plurality of storage devices so that the plurality of storage devices remains in the second operating mode;
receive a second host command to access an LBA;
determine a storage device in the plurality of storage devices where the LBA is located; and
indicate only to the storage device where the LBA is located, that the storage device where the LBA is located should transition from the second operating mode to the first operating mode.

2. The data storage system of claim 1 wherein the plurality of storage devices comprise at least one hard disk drive, and at least one solid state drive.

3. The data storage system of claim 1 wherein the bridge is further configured to store a lookup table, and determine the storage device in the plurality of storage devices where the LBA is located using the lookup table.

4. The data storage system of claim 1 wherein the second operating mode comprises a slumber mode.

5. The data storage system of claim 1 wherein at least one of the plurality of storage devices comprise a cache memory located in a hard disk drive.

6. The data storage system of claim 1 wherein the bridge comprises a serial advanced technology attachment ("SATA") to dual SATA bridge.

7. The data storage system of claim 1 wherein the bridge is further configured to maintain the plurality of storage devices, aside from the storage device where the LBA is located, in the second operating mode.

8. The data storage system of claim 1 wherein the data storage system and the host form a computer system.

9. A method for accessing a logical block address, the method comprising:
receiving at a bridge in a data storage system, a first host command from a host for the data storage system to enter a first operating mode;
preventing the first host command from reaching a plurality of storage devices in the data storage system so that the plurality of storage devices remains in a second operating mode, wherein each of the storage devices in the plurality of storage devices is configured to be in the first operating mode or the second operating mode, and wherein the first operating mode comprises an active mode where the storage device is ready to send or receive data and the second operating mode comprises a reduced power mode relative to the first operating mode;
receiving at the bridge in the data storage system, a second host command from the host, to access the logical block address ("LBA");
determining, using the bridge, a storage device in the plurality of storage devices in the data storage system where the LBA is located, wherein each of the storage devices in the plurality of storage devices comprise a plurality of LBAs; and
indicating, using the bridge, to only the storage device where the LBA is located, that the storage device where the LBA is located should transition from the second operating mode to the first operating mode.

10. The method of claim 9 wherein the plurality of storage devices comprise at least one hard disk drive and at least one solid state drive.

11. The method of claim 9 further comprising:
using a lookup table stored in the bridge to determine the storage device in the plurality of storage devices where the LBA is located.

12. The method of claim 9 wherein the second operating mode comprises a slumber mode.

13. The method of claim 9 further comprising:
maintaining the plurality of storage devices, aside from the storage device where the LBA is located, in the second operating mode.

14. The data storage system of claim 1 wherein the bridge is further configured to indicate to the host that the plurality of storage devices are in the first operating mode when one or more of the plurality of storage devices are in the second operating mode.

15. The data storage system of claim 14 wherein the host is configured to transmit host data to the plurality of storage devices when the bridge indicates to the host that the plurality of storage devices are in the first operating mode.

16. The method of claim 9 further comprising:
indicating to the host, using the bridge, that the plurality of storage devices are in the first operating mode when one or more of the plurality of storage devices are in the second operating mode.

17. The data storage system of claim 1 wherein the first host command is a Host Initiated Power Management (HIPM) command.

18. The method of claim 9 wherein the first host command is a Host Initiated Power Management (HIPM) command.

* * * * *